United States Patent
Symons et al.

(10) Patent No.: US 11,683,579 B1
(45) Date of Patent: Jun. 20, 2023

(54) MULTISTREAM CAMERA ARCHITECTURE

(71) Applicant: Samsara Inc., San Francisco, CA (US)

(72) Inventors: Jason Symons, Dublin, CA (US); Vignesh Bhuvaneshwar Iyer, Los Altos, CA (US); Naveen Chinya Krishnamurthy, Fremont, CA (US); John Charles Bicket, Burlingame, CA (US); Meelap Shah, Portland, OR (US); Adam Eric Funkenbusch, Minneapolis, MN (US); Kathryn Siegel, San Francisco, CA (US); Arthur Pohsiang Huang, San Francisco, CA (US); Joyce Tian Chen, San Francisco, CA (US); Karthikram Rajadurai, San Leandro, CA (US)

(73) Assignee: SAMSARA INC., San Francisco, CA (US)

( * ) Notice: Subject to any disclaimer, the term of this patent is extended or adjusted under 35 U.S.C. 154(b) by 0 days.

(21) Appl. No.: 17/741,104

(22) Filed: May 10, 2022

Related U.S. Application Data

(60) Provisional application No. 63/327,122, filed on Apr. 4, 2022.

(51) Int. Cl.
*H04N 23/62* (2023.01)
*G06V 10/20* (2022.01)
(Continued)

(52) U.S. Cl.
CPC .......... *H04N 23/62* (2023.01); *G06V 10/255* (2022.01); *G06V 10/7715* (2022.01); *H04N 23/66* (2023.01); *H04N 23/90* (2023.01)

(58) Field of Classification Search
CPC ................................................. H04N 5/23216
(Continued)

(56) References Cited

U.S. PATENT DOCUMENTS

| 5,917,433 A | 6/1999 | Keillor et al. |
| 6,452,487 B1 | 9/2002 | Krupinski |

(Continued)

FOREIGN PATENT DOCUMENTS

| CN | 112333145 A | | 2/2021 | |
| NZ | 598897 A | * | 9/2013 | ......... A63B 24/0021 |

OTHER PUBLICATIONS

U.S. Appl. No. 17/827,257, Video Gateway for Camera Discovery and Authentication, filed May 27, 2022.

*Primary Examiner* — Joel W Fosselman
(74) *Attorney, Agent, or Firm* — Knobbe, Martens, Olson & Bear LLP

(57) ABSTRACT

A video gateway device at a worksite (or other location) is coupled to multiple cameras on a network, such as multiple cameras at a business site. The gateway device determines video stream capabilities of each camera and, based on the capabilities, determines whether any additional video steams need to be created for particular cameras. For example, for cameras that provide only a high-resolution video stream, the gateway will generate (e.g., via downsampling) a standard-resolution video stream for artificial intelligence ("AI") analysis and a low-resolution video stream for viewing by a user. However, for cameras that provide both a high and standard-resolution video stream, the gateway device uses the camera-provided standard-resolution video stream for AI analysis, rather than generating a new video stream on the gateway device.

7 Claims, 5 Drawing Sheets

(51) Int. Cl.
*G06V 10/77* (2022.01)
*H04N 23/66* (2023.01)
*H04N 23/90* (2023.01)

(58) Field of Classification Search
USPC .................................................. 348/333.01
See application file for complete search history.

(56) References Cited

U.S. PATENT DOCUMENTS

| | | | |
|---|---|---|---|
| 8,633,672 | B2 | 1/2014 | Jung et al. |
| 9,024,744 | B2 | 5/2015 | Klose et al. |
| 9,445,270 | B1 | 9/2016 | Bicket et al. |
| 9,477,639 | B2 | 10/2016 | Fischer et al. |
| 10,033,706 | B2 | 7/2018 | Bicket et al. |
| 10,085,149 | B2 | 9/2018 | Bicket et al. |
| 10,102,495 | B1 | 10/2018 | Zhang et al. |
| 10,173,486 | B1 | 1/2019 | Lee et al. |
| 10,173,544 | B2 | 1/2019 | Hendrix et al. |
| 10,196,071 | B1 | 2/2019 | Rowson et al. |
| 10,206,107 | B2 | 2/2019 | Bicket et al. |
| 10,390,227 | B2 | 8/2019 | Bicket et al. |
| 10,579,123 | B2 | 3/2020 | Tuan et al. |
| 10,609,114 | B1 | 3/2020 | Bicket et al. |
| 10,623,899 | B2 | 4/2020 | Watkins et al. |
| 10,827,324 | B1 | 11/2020 | Hajimiri et al. |
| 10,843,659 | B1 | 11/2020 | Innocenzi et al. |
| 11,046,205 | B1 | 6/2021 | Govan et al. |
| 11,122,488 | B1 | 9/2021 | Lloyd et al. |
| 11,126,910 | B1 | 9/2021 | Akhtar et al. |
| 11,128,130 | B2 | 9/2021 | Jain et al. |
| 11,131,986 | B1 | 9/2021 | Gal et al. |
| 11,132,853 | B1 | 9/2021 | Akhtar et al. |
| 11,137,744 | B1 | 10/2021 | Heddleston et al. |
| 11,158,177 | B1 | 10/2021 | ElHattab et al. |
| 11,184,422 | B1 | 11/2021 | Bicket et al. |
| 11,188,046 | B1 | 11/2021 | ElHattab et al. |
| 11,190,373 | B1 | 11/2021 | Stevenson et al. |
| 11,341,786 | B1 | 5/2022 | Calmer et al. |
| 11,349,901 | B1 | 5/2022 | Duffield et al. |
| 11,352,013 | B1 | 6/2022 | Srinivasan et al. |
| 11,352,014 | B1 | 6/2022 | Srinivasan et al. |
| 11,356,605 | B1 | 6/2022 | Shemet et al. |
| 11,356,909 | B1 | 6/2022 | Lloyd |
| 11,365,980 | B1 | 6/2022 | Akhtar et al. |
| 11,386,325 | B1 | 7/2022 | Srinivasan et al. |
| 11,451,610 | B1 | 9/2022 | Saunders et al. |
| 11,451,611 | B1 | 9/2022 | Saunders et al. |
| 2002/0061758 | A1 | 5/2002 | Zarlengo et al. |
| 2005/0286774 | A1 | 12/2005 | Porikli |
| 2006/0167591 | A1 | 7/2006 | McNally |
| 2008/0319602 | A1 | 12/2008 | McClellan et al. |
| 2009/0240427 | A1 | 9/2009 | Siereveld et al. |
| 2010/0049639 | A1 | 2/2010 | Ferro et al. |
| 2011/0276265 | A1 | 11/2011 | Husain |
| 2012/0201277 | A1 | 8/2012 | Tanner et al. |
| 2012/0235625 | A1 | 9/2012 | Takehara |
| 2012/0288165 | A1* | 11/2012 | Bedros ................ G06V 10/993 382/118 |
| 2012/0303397 | A1 | 11/2012 | Prosser |
| 2013/0162421 | A1 | 6/2013 | Inaguma et al. |
| 2013/0244210 | A1 | 9/2013 | Nath et al. |
| 2014/0012492 | A1 | 1/2014 | Bowers et al. |
| 2014/0095061 | A1 | 4/2014 | Hyde |
| 2014/0098060 | A1 | 4/2014 | McQuade et al. |
| 2014/0195106 | A1 | 7/2014 | McQuade et al. |
| 2014/0278108 | A1 | 9/2014 | Kerrigan et al. |
| 2014/0354227 | A1 | 12/2014 | Tyagi et al. |
| 2014/0354228 | A1 | 12/2014 | Williams et al. |
| 2015/0044641 | A1 | 2/2015 | Chauncey et al. |
| 2015/0074091 | A1 | 3/2015 | Walkin et al. |
| 2015/0226563 | A1 | 8/2015 | Cox et al. |
| 2015/0283912 | A1 | 10/2015 | Shimizu et al. |
| 2016/0275376 | A1 | 9/2016 | Kant |
| 2016/0288744 | A1 | 10/2016 | Rutherford et al. |
| 2016/0343091 | A1 | 11/2016 | Han et al. |
| 2016/0375780 | A1 | 12/2016 | Penilla et al. |
| 2017/0039784 | A1 | 2/2017 | Gelbart et al. |
| 2017/0102463 | A1 | 4/2017 | Hwang |
| 2017/0140603 | A1 | 5/2017 | Ricci |
| 2017/0263049 | A1 | 9/2017 | MacDonald et al. |
| 2017/0286838 | A1 | 10/2017 | Cipriani et al. |
| 2017/0291611 | A1 | 10/2017 | Innes et al. |
| 2017/0332199 | A1 | 11/2017 | Elliott et al. |
| 2017/0345283 | A1 | 11/2017 | Kwon et al. |
| 2017/0366935 | A1 | 12/2017 | Ahmadzadeh et al. |
| 2018/0001771 | A1 | 1/2018 | Park et al. |
| 2018/0012196 | A1 | 1/2018 | Ricci et al. |
| 2018/0025636 | A1 | 1/2018 | Boykin et al. |
| 2018/0063576 | A1 | 3/2018 | Tillman et al. |
| 2018/0093672 | A1 | 4/2018 | Terwilliger et al. |
| 2018/0262724 | A1 | 9/2018 | Ross |
| 2019/0003848 | A1 | 1/2019 | Hoten et al. |
| 2019/0043054 | A1 | 2/2019 | Crank et al. |
| 2019/0118655 | A1 | 4/2019 | Grimes et al. |
| 2019/0174158 | A1 | 6/2019 | Herrick et al. |
| 2019/0215486 | A1* | 7/2019 | Venshtain ................ H04N 5/33 |
| 2019/0244301 | A1 | 8/2019 | Seth et al. |
| 2019/0286948 | A1 | 9/2019 | Sathyanarayana et al. |
| 2019/0318419 | A1 | 10/2019 | VanderZanden |
| 2019/0327590 | A1 | 10/2019 | Kubo et al. |
| 2019/0327613 | A1 | 10/2019 | Bicket et al. |
| 2020/0074397 | A1 | 3/2020 | Burda et al. |
| 2020/0139847 | A1 | 5/2020 | Baumer et al. |
| 2020/0150739 | A1 | 5/2020 | Tuan et al. |
| 2020/0162489 | A1 | 5/2020 | Bar-Nahum et al. |
| 2020/0342230 | A1 | 10/2020 | Tsai et al. |
| 2020/0342235 | A1 | 10/2020 | Tsai et al. |
| 2020/0342274 | A1 | 10/2020 | ElHattab et al. |
| 2020/0342506 | A1 | 10/2020 | Levy et al. |
| 2020/0342611 | A1 | 10/2020 | ElHattab et al. |
| 2020/0344301 | A1 | 10/2020 | ElHattab et al. |
| 2020/0371773 | A1 | 11/2020 | Kato et al. |
| 2020/0389415 | A1 | 12/2020 | Zhao et al. |
| 2021/0006950 | A1 | 1/2021 | Hajimiri et al. |

* cited by examiner

FIG. 4

MULTISTREAM CAMERA ARCHITECTURE

TECHNICAL FIELD

Embodiments of the present disclosure relate to devices, systems, and methods that process video data from multiple cameras.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from on-premises equipment, such as cameras that provide varying video streaming capabilities, requires significant data storage and processing power. Depending on the capabilities of the cameras, analysis of the video streams may not be optimum. For example, if only a high-resolution video stream is available, feature detection and/or other processing of the video stream may require significant processing and storage resources.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. For example, existing gateway systems are limited in various ways, such as by the sensor data provided by various cameras that provide video streams of varying resolutions and qualities. Various embodiments of the present disclosure provide significant improvements over such technology, and practical applications of such improvements. Additionally, various embodiments of the present disclosure are inextricably tied to, and provide practical applications of, computer technology. In particular, various embodiments rely on detection of user inputs via graphical user interfaces, operation and configuration of cameras and video processing devices, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology.

In some embodiments discussed herein, a video gateway device at a worksite (or other location) is coupled to multiple cameras on a network, such as multiple cameras at a business site. The gateway device determines video stream capabilities of each camera and, based on the capabilities, determines whether any additional video steams need to be created for particular cameras. For example, for cameras that provide only a high-resolution video stream, the gateway will generate a standard-resolution video stream for artificial intelligence ("AI") analysis and a low-resolution video stream for viewing by a user. However, for cameras that provide both a high and standard-resolution video stream, the gateway device uses the camera-provided standard-resolution video stream for AI analysis, rather than generating a new video stream on the gateway device.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 is an example user interface that may be displayed on the site monitor device and/or other devices having appropriate access rights.

DETAILED DESCRIPTION

Figure 1:
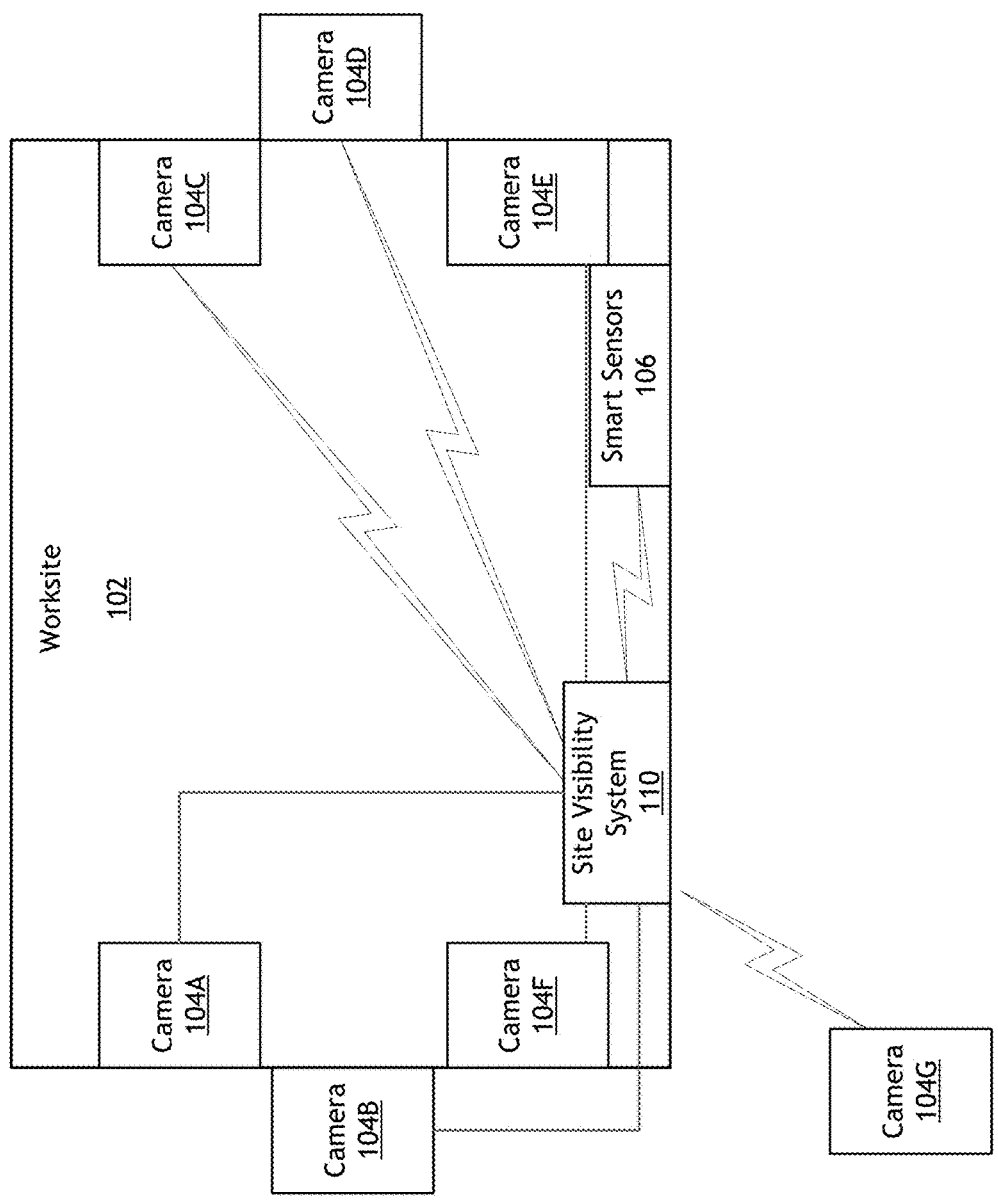
FIG. 1 is a block diagram of an example worksite with multiple cameras communicating with a video gateway device, which is referred to herein as a site visibility system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

OVERVIEW

In some embodiments discussed herein, a video gateway device at a worksite (or other location) is coupled to multiple cameras on a network, such as multiple cameras at a business site. The gateway device determines video stream capabilities of each camera and, based on the capabilities, determines whether any additional video steams need to be created for particular cameras. For example, for cameras that provide only a high-resolution video stream, the gateway will generate (e.g., via downsampling) a standard-resolution video stream for artificial intelligence ("AI") analysis and a low-resolution video stream for viewing by a user. However, for cameras that provide both a high and standard-resolution video stream, the gateway device uses the camera-provided standard-resolution video stream for AI analysis, rather than generating a new video stream on the gateway device.

TERMS

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Camera: an electronic device that includes one or more sensors configured to obtain video data and/or audio data. For example, some cameras may stream only a single resolution of video data, such as a high-resolution video stream, while other cameras may stream both a high-resolution video stream and a low-resolution video stream. The cameras may be in communication with a local gateway device, or local site visibility system, via one or more wired and/or wireless connections, such as via a local area network.

High-resolution video stream: video files that are renderable to depict significant detail. For example, high-resolution video may be 1080p, 1440p, 2K, 4K, 8K, etc. video. The term high-resolution video does not signify any particular resolution or frame rate, but more generally indicates a video file that holds more image detail than a corresponding low-resolution video.

Low-resolution video stream: video files that are renderable to depict less detail than a corresponding standard or high-resolution video file. For example, low-resolution video may be 240p or 360p or less. The term low-resolution video does not signify any particular resolution or frame rate, but more generally indicates a video file that holds less image detail than a corresponding high-resolution video.

Standard-resolution video stream: video files that are renderable to depict less detail that high-resolution video files. For example, standard-resolution video may be 720p video. The term standard-resolution video does not signify any particular resolution or frame rate, but more generally indicates a video file that holds less image detail than high-resolution video and more detail than low-resolution video.

Event Data: data associated with an event, such as a set of sensor data (e.g., metadata and/or asset data), such as photographs, video files, etc., associated with a detected event.

Feature detection: a computerized process that processes video data to identify features in one or more images of the video data and which may be provided to one or more event models to determine if an event of interest is detected. Feature detection may be performed by a local site visibility system and/or at a cloud site visibility system to detect events of interest, such as safety events.

Event Model (or "triggering criteria"): a set of logic that may be applied to sensor data to determine when an event has occurred. An event model may be, for example, an algorithm, statistical model, or neural network that takes as input one or more types of sensor data, such as a standard-resolution video stream from each of one or more cameras. An event model may be stored in any format, such as a list of criteria, rules, thresholds, and the like, that indicate occurrence of an event. Event models may also receive input from a feature detection component configured to detect features in video data. Event models may be executed by a local and/or cloud site visibility system.

Event models and/or feature detection may be performed by using machine learning components that can be used to assist in identification of features (e.g., a person within a restricted area) that may trigger events. For example, a machine learning component can implement machine learning algorithms or artificial intelligence (AI) to generate and/or update neural networks that are executed by a processor (e.g., at a local and/or cloud site visibility system). In some embodiments, the machine learning component can use one or more machine learning algorithms to generate one or more models or parameter functions for the detections. A feature detection module may comprise a plurality of layered and/or hierarchical models that each produce an output that is pooled together. Further, the feature detection module may comprise a thin layer of models that is independently defined and tunable. The machine learning component can be configured to generate an event model that understands which types of data indicate which types of detections. One or more of these event models may be used to determine an expected value or occurrence based on analysis of received data. In some embodiments, event models can include event detection criteria designated by a user, admin, or automatically. For example, the criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the local site visibility system may be regenerated on a periodic basis (e.g., by the cloud site visibility system) as new received data is available to help keep the predictions in the event detection model more accurate as the data is collected over time.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example MultiStream Camera Systems and Functions

FIG. 1 is a block diagram of an example worksite 102 with multiple cameras 104 communicating with a video gateway device, which is referred to herein as a site visibility system 110. The worksite 102 may represent a single room, such as a workroom of a manufacturing facility, or may represent multiple rooms, buildings, and/or outdoor areas. For example, in another embodiment, the worksite 102 includes multiple buildings and/or outdoor areas associated with a particular entity, such as a business campus of a company that includes multiple buildings and outdoor locations.

In the example of FIG. 1, the site visibility system 110, which may also be referred to as a local site visibility system or video gateway, communicates with each of multiple cameras 104 at or near the worksite 102. Depending on the implementation, cameras may be connected via wired connections, such as cameras 104A, 104B, 104F, 104E in the example of FIG. 1, or via wireless connections, such as cameras 104G, 104C, and 104D in the example of FIG. 1. Additionally, the cameras may be manufactured by different entities and have different capabilities. For example, camera 104A may be configured to output only a single video stream (e.g., a high-resolution video stream), while camera 104B may be configured to output multiple video streams (e.g., a high-resolution and a low-resolution video stream). Advantageously, the site visibility system 110 is configured to determine capabilities of each of the cameras 104 and customize any video stream generation processes based on the particular capabilities of particular cameras, as discussed further below.

FIG. 1 also includes smart sensors 106 which represent additional sensors that may be configured to communicate with the site visibility system 110. Any other type of sensor, such as temperature, moisture, motion, distance, etc. may be installed at the worksite 102 and configured to communicate with the site visibility system 110 either wirelessly or via a wired connection.

Figure 2:
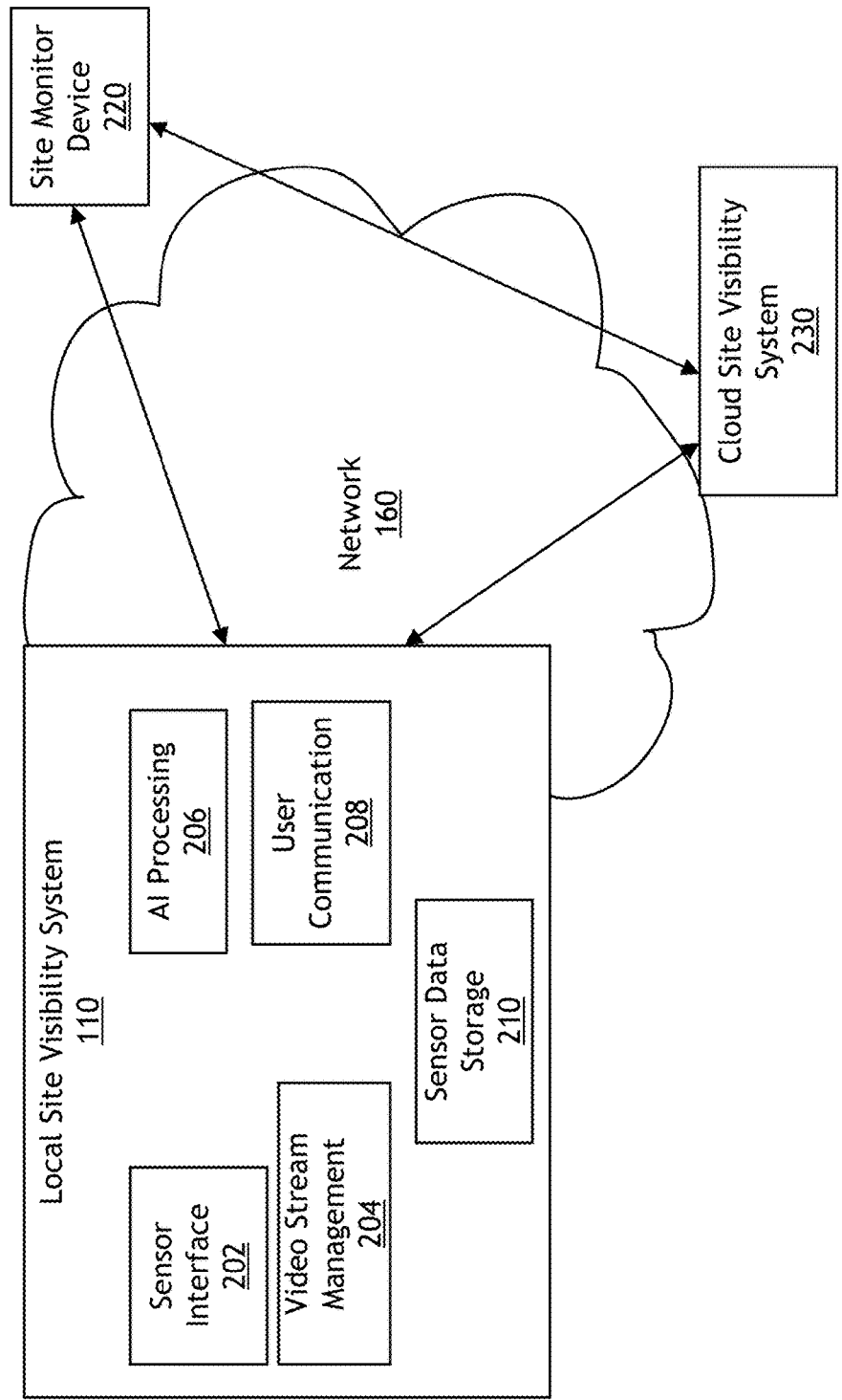
FIG. 2 is a block diagram of the example site visibility system (or "local" site visibility system) in communication with a site monitor device and with a cloud site visibility system.

FIG. 2 is a block diagram of the example site visibility system 110 (or "local" site visibility system 110) in communication with a site monitor device 220 and with a cloud site visibility system 230. In this example, the local site visibility system 110 communicates sensor data, such as one or more video streams acquired from cameras 104, to the site monitor device 220, which may be a mobile phone, tablet, laptop, desktop computer, or other device, operated by a site manager, which generally denotes an individual that has an interest in monitoring activity at the worksite 102, such as a site manager, owner, safety manager, etc.

Figure 3:
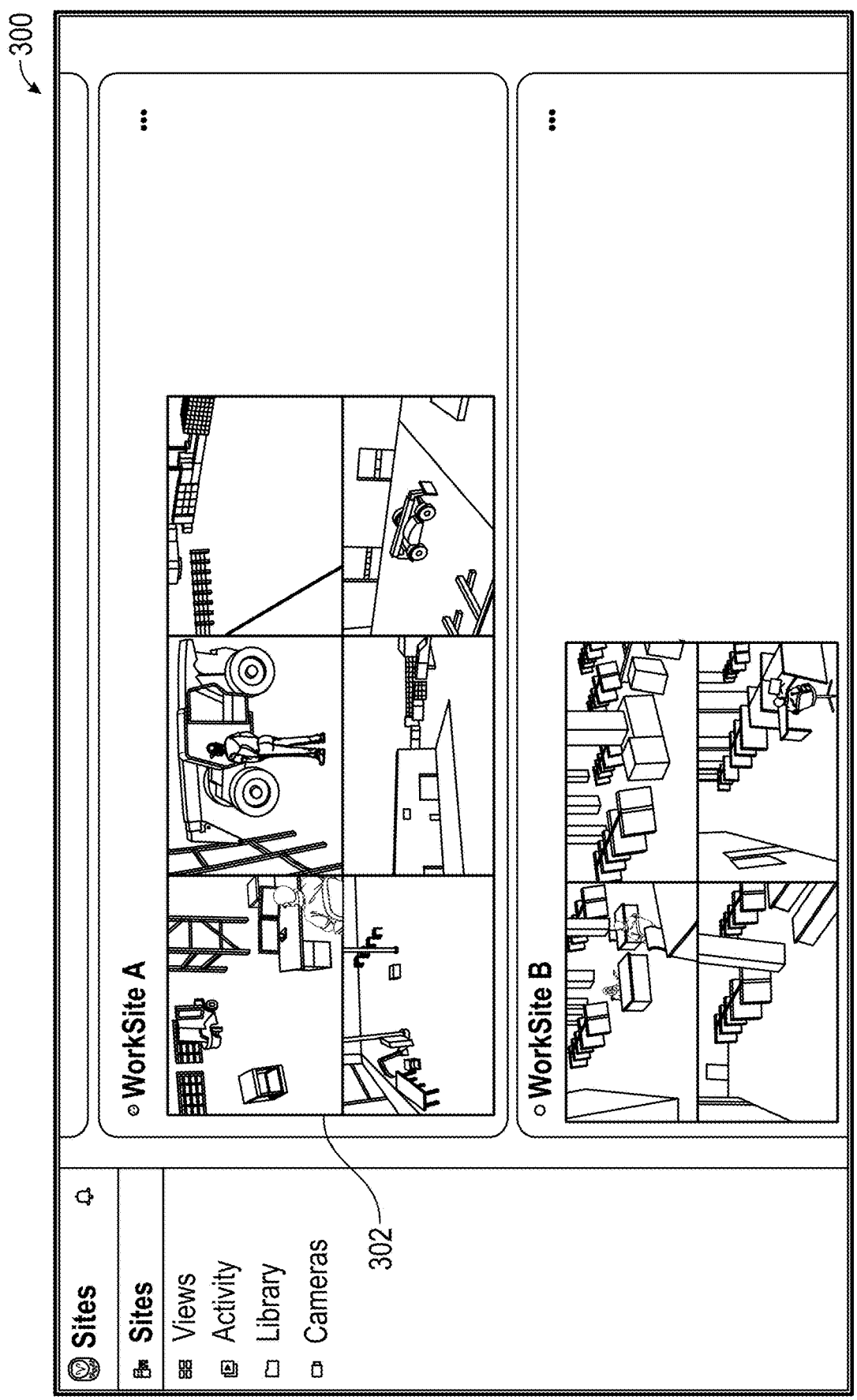
FIG. 3 is an example monitoring user interface that may be displayed on the site monitor device.

FIG. 3 is an example monitoring user interface 300 that may be displayed on the site monitor device 220. In the example of FIG. 3, video stills from each of two different worksites are displayed. The video stills may each be acquired from different cameras at the corresponding worksite. In one embodiment, the video stills, and corresponding video streams that are requested by the user, are received at the site monitor device 220 from the local site visibility system 110. In some embodiments, the video stills and/or corresponding video streams are received from the cloud site visibility system 230. In some embodiments, certain video streams and/or related metadata may be received from the local site visibility system 110, while other types of video streams and/or related metadata may receive from the cloud site visibility system 230.

In one embodiments, some or all of the video stills are replaced with live video streams from the corresponding cameras. For example, low-resolution video streams associated with the cameras may be displayed in the monitoring user interface 300. As discussed further below, for some cameras the low-resolution video stream may be generated by downsampling another video stream from the particular camera, while other cameras may generate a low-resolution video stream suitable for thumbnail display and rendering. In some embodiments, the monitoring interface 300 includes video stills from each of the cameras, and a user input associated with a particular video still causes the low-resolution video stream from that site to replace the video still. For example, the user may hover a pointer over image 302, or perform a particular gesture associated with image 302, to cause the video still image 302 to be replaced with a live video stream from the corresponding camera.

In the example of FIG. 3, each of the video stills may be selected to initiate display of a high-resolution video stream associated with the video still. For example, a user could select image 302 to initiate display of a high-resolution video stream in a new window, or replacing the video stills shown in FIG. 3.

The local site visibility system 110 may also communicate with the cloud site visibility system 230, such as to provide sensor data (e.g., video stream and/or other sensor data) for further analysis, such as to determine whether triggered alerts are accurate and to generate updated models for triggering such alerts.

Figure 5:
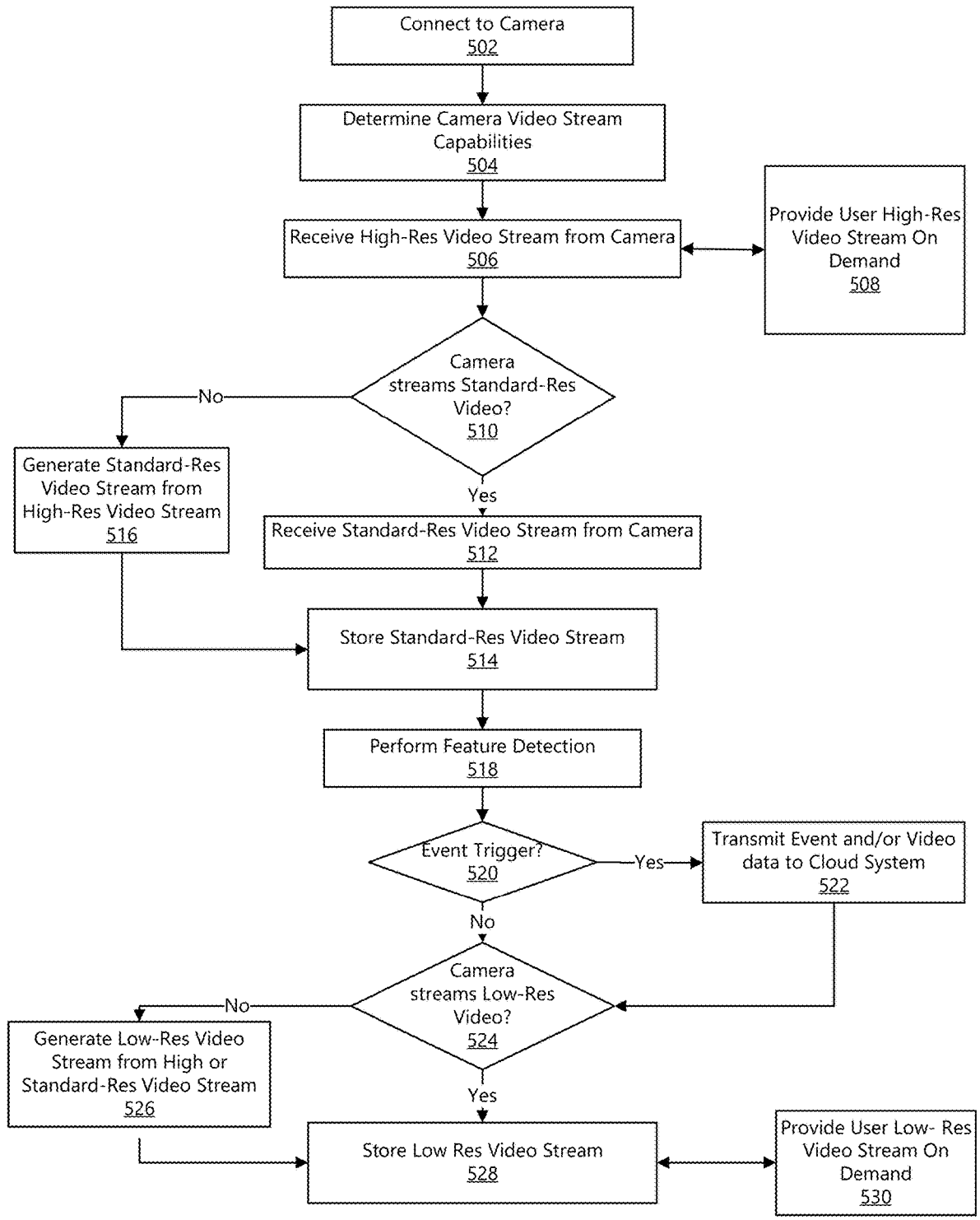
FIG. 5 is a flowchart illustrating an example of one embodiment of a process that may be performed by a local site visibility system, such as by the various components of the local site visibility system discussed above.

In the example embodiment of FIG. 2, the local site visibility system 110 includes a sensor interface 202, which generally is any hardware and/or software components that are configured to communicate with sensors, such as the cameras 104 and the smart sensors 106 of FIG. 1. The video stream management component 204 is configured to determine video streaming capabilities of specific cameras and generate additional video streams for particular cameras, as needed. FIG. 5, discussed below, provides one example workflow that may be performed by the video stream management component 204. The sensor data storage 210 stores video streams received from cameras 104 and/or generated by the video stream management component 204. For example, the sensor data storage 210 may be configured to store a certain rolling time period (e.g., the last 48 hours) of high-resolution and standard-resolution video data, and another longer rolling time period (e.g., the last 96 hours) of low-resolution video data. The sensor data storage 210 may include one or multiple storage devices, such as hard drives, servers, and/or server farms to facilitate storage of the sensor data. In some embodiments, certain sensor data may be offloaded from the sensor data storage 210 to a storage system associated with the cloud site visibility system 230. For example, certain snippets of video data associated with any detected event, e.g., 30 seconds before and 30 seconds after, may be stored by the cloud site visibility system 230 for some longer time (e.g., six months or longer).

The AI processing 206 generally performs feature detection on the sensor data, e.g., video data from the cameras 104 and/or other sensor data from the smart sensors 106, such as to identify events of interest. For example, an event of interest at a manufacturing facility might be to indicate that an assembly line has stopped moving for a certain period of time, such as based on analysis of the video stream from one or more cameras having the assembly line within their field of view. The AI processing component 206 may include machine learning, neural network, and/or other artificial intelligence algorithms that generate and/or update models for detection of certain events. For example, in some embodiments, users may provide feedback on accuracy of identified features and/or events. For example, a user may indicate that video data associated with a "stopped line" event that was detected by the AI processing 206 does not actually show a stopped assembly line, but rather shows a large object blocking much of the cameras view of the assembly line. With this feedback, the AI processing 206 may update and/or optimize a model for triggering a stopped line event so that similar false positive event detections occur in the future.

In some embodiments, the cloud site visibility system 230 also includes an AI processing component, which may be more robust than the AI processing 206 at the local site visibility system 110. Thus, in some embodiments, model optimization is performed at the cloud site visibility system 230, such as based on one or more video streams that are provided by the local site visibility system 110. In some embodiments, a standard-resolution video stream, which typically is generated by the local site visibility system 110 based on another resolution video stream from a camera, is used in the feature detection and other AI processing.

User communication compartment 208 is configured to communicate with one or more external devices, such as the site monitor device 220 and/or the cloud site visibility system 230. In some embodiments, the communication component 208 provides sensor data, such as low-resolution and/or high-resolution video streams from one or more cameras, to the site monitor device 220, such as at the request of the user of the site monitor device 220.

Figure 4:
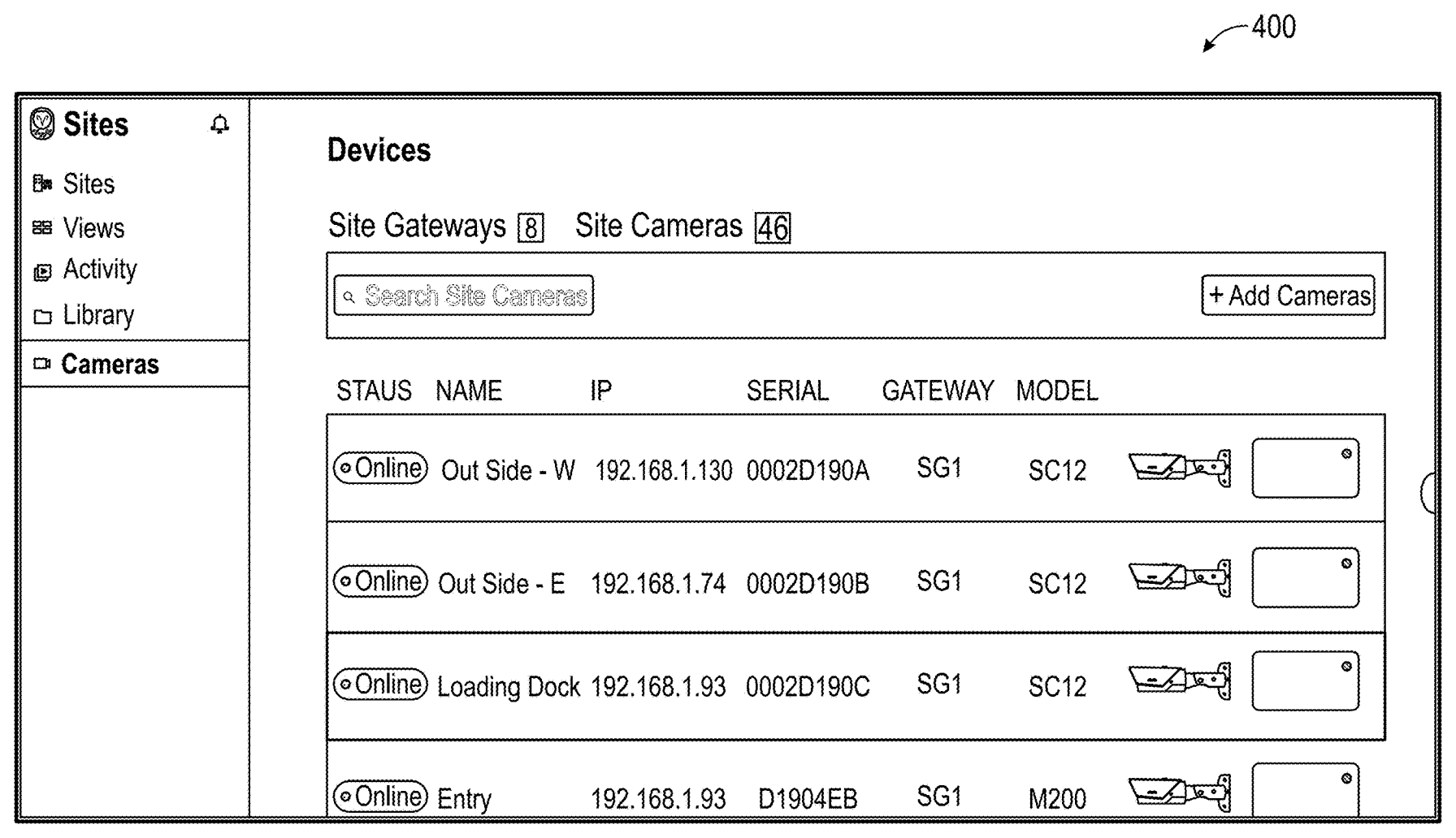

FIG. 4 is an example user interface that may be displayed on the site monitor device 220 and/or other devices having appropriate access rights. In this example, general information regarding each of the cameras at a site is displayed. In this example, for each camera, information including a status, camera name, IP address, serial number, gateway, camera model, image of the camera, and a still video image from the camera, may be displayed. The user interface 400 includes these details regarding five cameras, which are each associated with a same gateway (e.g., "SG1") at a particular worksite. In some implementations, a worksite may include multiple gateways (e.g., local site visibility system 110) that are each in communication with a different set of sensors. For example, multiple gateways, such as multiple local site visibility systems 110, may be located at a worksite and each include the same or similar components and functions. In embodiments with multiple gateways, one gateway may be designated as a primary gateway that monitors and coordinates video streaming and downsampling activities performed by other gateways. In the example of FIG. 4, the first three cameras are a same model ("SC12"), while the last camera is a different model ("M200"). As discussed elsewhere herein, the video stream management component 204 is advantageously configured to determine video streaming capabilities of different cameras and to determine whether any additional video streams for a particular camera should be generated.

FIG. 5 is a flowchart illustrating an example of one embodiment of a process that may be performed by a local site visibility system 110, such as by the various components of the local site visibility system 110 discussed above. In other embodiments, the method may include fewer and/or additional blocks and/or the blocks may be performed in order different than as illustrated. For ease of explanation, the process of FIG. 5 is discussed below with reference to communications with a single camera. However, the same process may be performed for each of multiple cameras in communication with the system 110, such as multiple cameras at a particular worksite.

Beginning at block 502, the system 110 establishes a communication channel with a camera. For example, when a camera is first powered on at a worksite, the local site visibility system 110 may be configured to establish a communication link, either wired or wireless, with the camera. Additional details regarding camera registration processes are discussed in related U.S. provisional application Ser. No. 63/363150, titled "VIDEO GATEWAY FOR CAMERA DISCOVERY AND AUTHENTICATION," filed Apr. 18, 2022, which is hereby incorporated by reference in its entirety and for all purposed.

Next, at block 504, the system 110 determines video streaming capabilities of the camera. For example, some cameras may stream only a high-resolution video stream, while others may stream multiple video streams, such as a high-resolution and a low-resolution video stream. In some embodiments, the processes of blocks 502 and 504 are performed only a single time, such as when a new camera is added to a worksite and connected to the system 110.

Moving to block 506, a high-resolution video stream from the camera is received and provided to one or more site monitor devices 220, such as on-demand. In some embodiments, the high-resolution video stream may only be transmitted to the system 110 upon request for the video stream. For example, a site monitor device 220 may open a user interface for display of high-resolution video from the camera, and the system 110 may correspondingly request transmission of the high-resolution video stream from the camera. In other embodiments, the high-resolution video stream may be continuously streamed and stored, such as on the sensor data storage 210, for a particular time period and/or using a particular amount of storage space. For example, a predetermined amount of storage space may be allocated for high-resolution video streams from all of the cameras in communication with the system and/or individual high-resolution video storage limits for individual cameras.

Next, at block 510, the system accesses the camera capabilities (that were determined at block 504) to determine whether the camera streams a standard-resolution video stream. If the camera does stream a standard-resolution video stream, the process continues to block 512 where the camera transmits the standard-resolution video stream to the system, such as for storage in the sensor data storage 210. As noted above with reference to storage of the high-resolution video stream, a standard-resolution video stream may be continuously streamed or streamed on-demand, and may be allocated a certain amount of storage space and/or standard-resolution video time period.

If at block 510 the system determines that the camera does not stream standard-resolution video, the method continues to block 516 where the system generates a standard-resolution video stream from the high-resolution video stream. For example, the high-resolution video stream may be down-sampled to generate a standard-resolution video stream.

Once a standard-resolution video stream from the camera is received (block 512) and/or generated (block 516) at the system 110, at block 518 feature detection and/or other artificial intelligence and/or machine learning processes may be performed on the standard-resolution video stream. Advantageously, the standard-resolution video stream includes enough details regarding features to allow accurate feature detection to be performed, while not requiring as much storage space and processing time as would be required for feature detection on a high-resolution video stream. Similarly, while the standard-resolution video stream requires additional storage space than a low-resolution video stream, the level of feature detection accuracy may be greatly improved with the level of detail in the standard-resolution video stream. In other embodiments, other video streams may be used in feature detection, such as the high-resolution video stream and/or low-resolution video stream. In some embodiments, feature detection at the local site visibility system 110 may be performed using the standard-resolution video stream, and feature detection at the cloud site visibility system may be performed using high-resolution video streams, such as to detect features that may not be easily detectable in the standard-resolution version of the video stream.

Next, at block 520, the system 110 monitors the feature detection performed at block 518 for detection of an event. Depending on the embodiment, an event may be associated with one or multiple features being detected in the standard-resolution video stream. For example, a first event may be triggered only when each of two different features are detected within a certain time period, while another event may be triggered by detection of only a single feature in a single standard-resolution video frame.

If any event trigger is detected at block 520, the process continues to block 522 where information regarding the event, such as an indication of the triggering event, video data associate with the event, and/or metadata regarding the event, may be transmitted to the cloud site visibility system for further processing. For example, a cloud site visibility system may analyze the standard-resolution video stream in greater detail than the local site visibility system 110 and/or may analyze other sensor data, such as a high-resolution video stream, to determine whether the triggered event is accurate and/or to update or otherwise optimize the model and/or rules used to trigger the particular event. In some embodiments, certain events may trigger transmission of an alert to one or more users, such as a user of a site monitor device 220.

Next, at block 524, the system 110 determines whether the camera streams a low-resolution video stream. If not, the method continues to block 526, where a low-resolution video stream is generated from the high-resolution or standard-resolution video stream. Once the low-resolution video stream is either generated (block 526) or received directly from the camera (block 528) the system 110 stores portions of the low-resolution video stream. For example, low-resolution video from a predefined time period, e.g., a previous 48 hours, may be stored at the local site visibility system 110, and provided to one or more site monitor devices for viewing. In some embodiments, low-resolution video may only be accessed and stored at the system 110 upon request by a site monitor device. In some embodiments, the low-resolution video stream is transmitted to the cloud site visibility system for analysis and/or storage. For example, a local site visibility system may store a first time period of low-resolution video stream (e.g., 48 hours), while a cloud site visibility system may store a second, extended, time period of low-resolution video stream (e.g., two weeks).

ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A video gateway system comprising:
   a communication interface configured to communicate with a plurality of cameras positioned at different locations associated with a physical location;
   a hardware computer processor;
   a non-transitory computer readable medium having software instructions stored thereon, the software instructions executable by the hardware computer processor to cause the video gateway system to perform operations comprising, for each of the plurality of cameras:
   in response to detecting the camera connected to a network, establish a communication link with the camera;
   receive from the camera an indication of one or more output video stream resolutions that the camera is capable of generating, including at least a high-resolution video stream;
   determine whether the camera is capable of generating a standard-resolution video stream and,
      in response to determining that the camera is capable of generating a standard-resolution video stream having a resolution lower than the high-resolution video stream, providing the standard-resolution video stream to a feature analysis component; or
      in response to determining that the camera is not capable of generating a standard-resolution video stream, initiating a downsampling of the high-resolution video stream to generate the standard-resolution video stream; and
   determine whether the camera is capable of generating a low-resolution video stream and,
      in response to determining that the camera is capable of generating a low-resolution video stream having a resolution lower than the standard-resolution video stream, storing the low-resolution video stream; or
      in response to determining that the camera is not capable of generating a low-resolution video stream, initiating a downsampling of the high-resolution video stream or standard-resolution video stream to generate the low-resolution video stream.

2. The video gateway system of claim 1, further comprising:
   a feature detection component configured to perform feature detection on the standard-resolution video streams.

3. The video gateway system of claim 2, wherein the feature detection component is configured to detect one or more objects within the standard-resolution video stream and to tag the standard-resolution video stream with detected objects.

4. The video gateway system of claim 3, wherein identification of a first tag initiates delivery of an alert to a remote user computer device.

5. The video gateway system of claim 1, further comprising:
   a user communication component configured to communicate with a remote user computing device via one or more networks, wherein the user communication component is configured to provide one or more video streams to a user interface rendered on the remote user computing device.

6. The video gateway system of claim 5, wherein the user interface includes a low-resolution video window configured to render portions of the low-resolution video streams from one or more of the cameras and one or more selectors for initiating a request for portions of high-resolution video streams.

7. A computerized method, performed by a computing system having one or more hardware computer processors and one or more non-transitory computer readable storage device storing software instructions executable by the computing system to perform the computerized method comprising:
   for each of a plurality of cameras positioned at different locations associated with a physical location:
      in response to detecting the camera connected to a network, establishing a communication link with the camera;
      receiving from the camera an indication of one or more output video stream resolutions that the camera is capable of generating, including at least a high-resolution video stream;
      determining whether the camera is capable of generating a standard-resolution video stream and,
         in response to determining that the camera is capable of generating a standard-resolution video stream having a resolution lower than the high-resolution video stream, providing the standard-resolution video stream to a feature analysis component; or
         in response to determining that the camera is not capable of generating a standard-resolution video stream, initiating a downsampling of the high-resolution video stream to generate the standard-resolution video stream; and
      determining whether the camera is capable of generating a low-resolution video stream and,
         in response to determining that the camera is capable of generating a low-resolution video stream having a resolution lower than the standard-resolution video stream, storing the low-resolution video stream; or in response to determining that the camera is not capable of generating a low-resolution video stream, initiating a downsampling of the high-resolution video stream or standard-resolution video stream to generate the low-resolution video stream.

\* \* \* \* \*